C. A. BISHOP.
APPARATUS FOR EFFECTING CALCULATIONS.
APPLICATION FILED AUG. 27, 1909.
1,065,500.
Patented June 24, 1913.
3 SHEETS—SHEET 3.
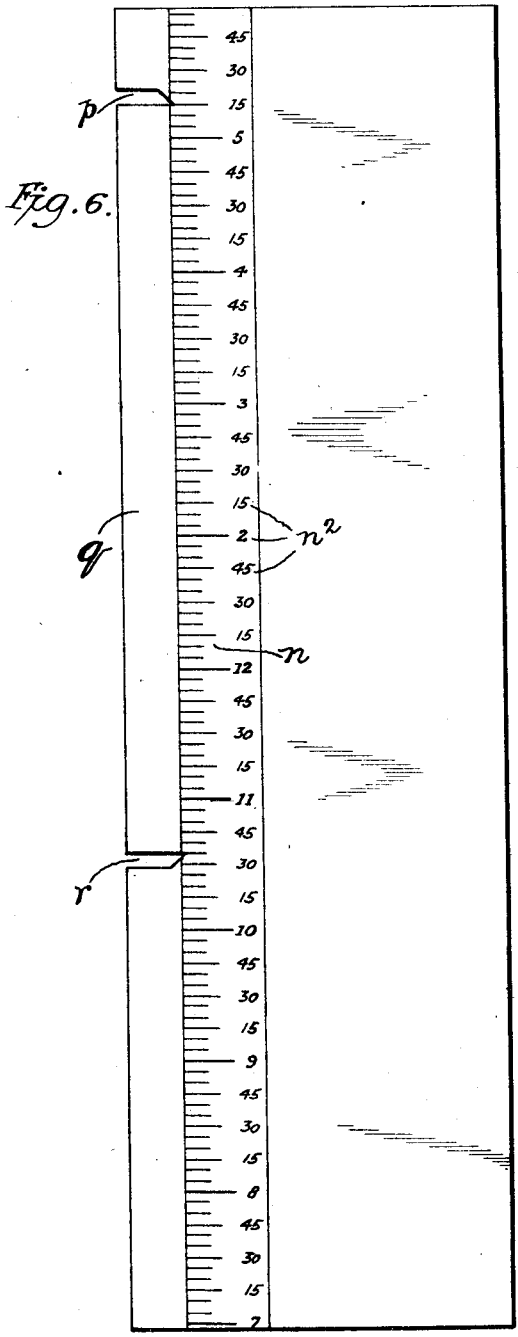
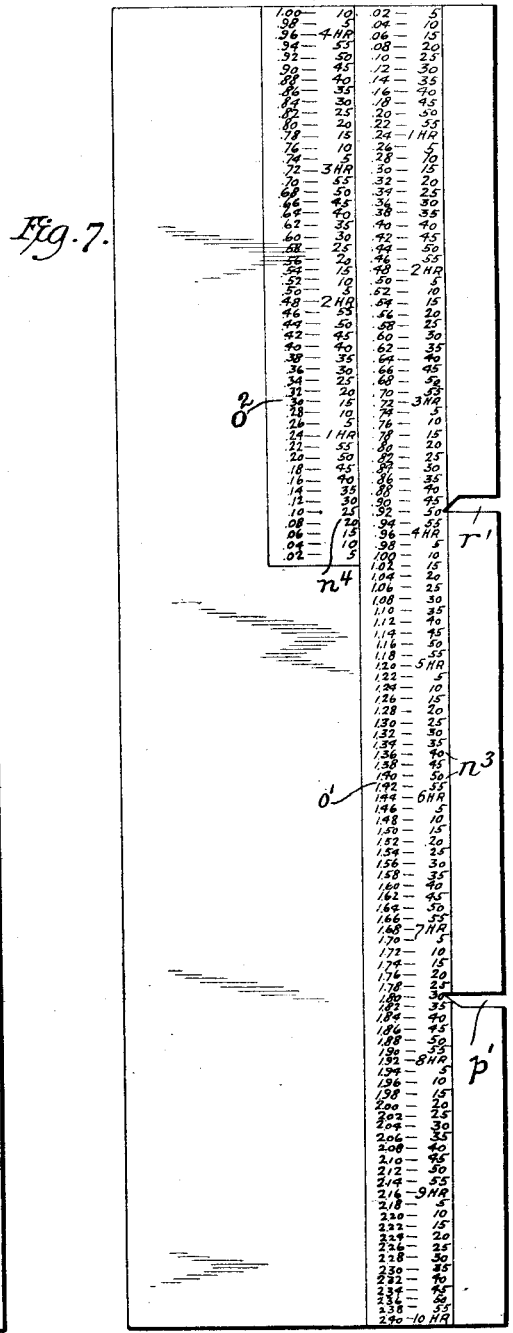
WITNESSES:
INVENTOR,
Clarence A. Bishop,
BY Griffin & Bernhard
ATTORNEYS.

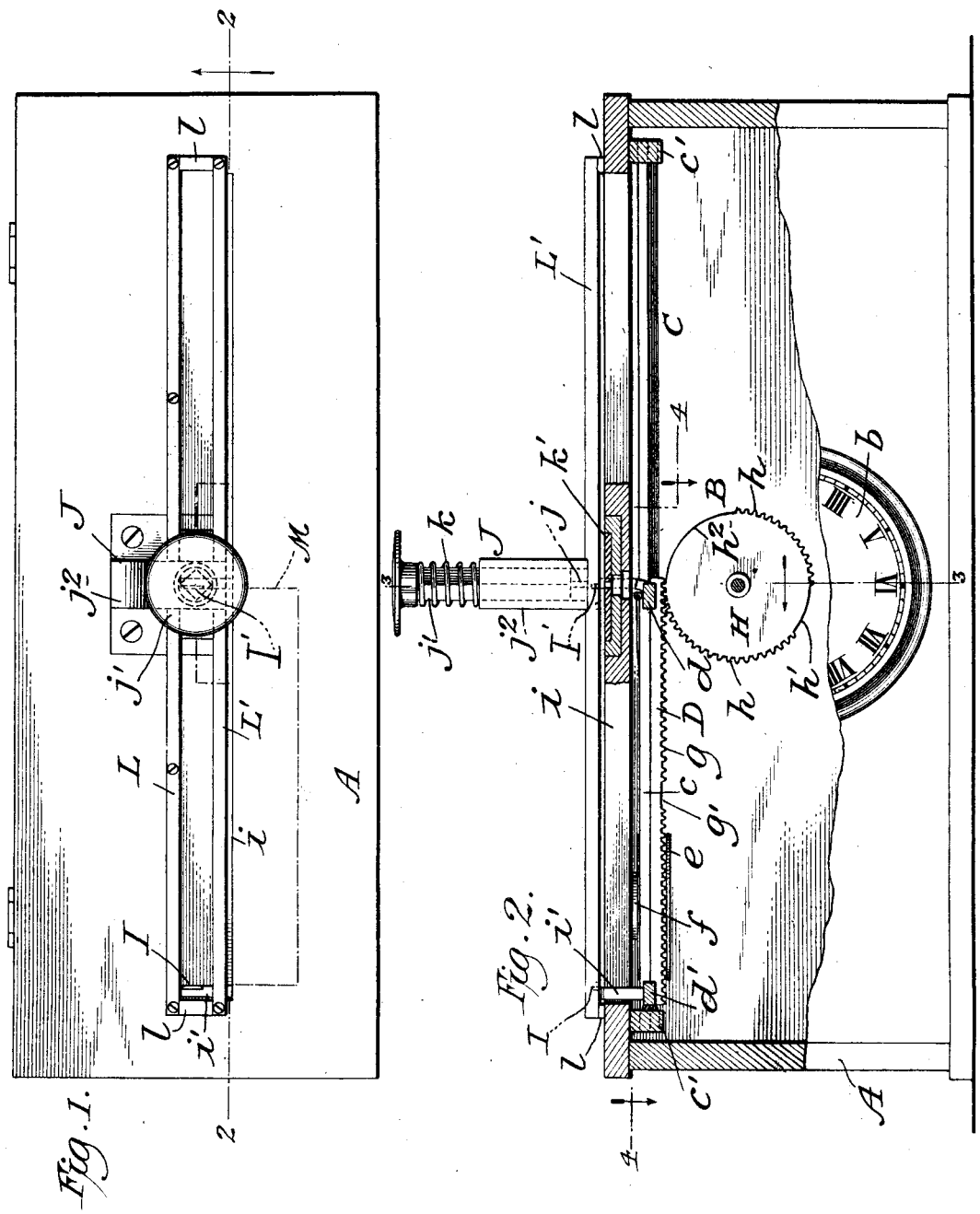

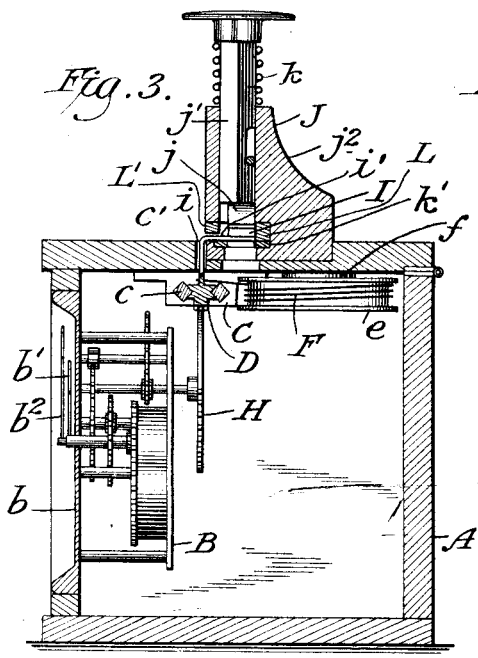
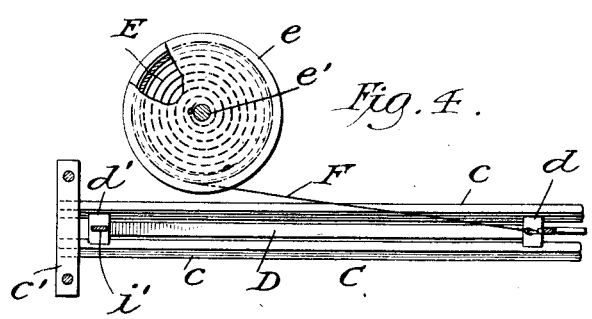
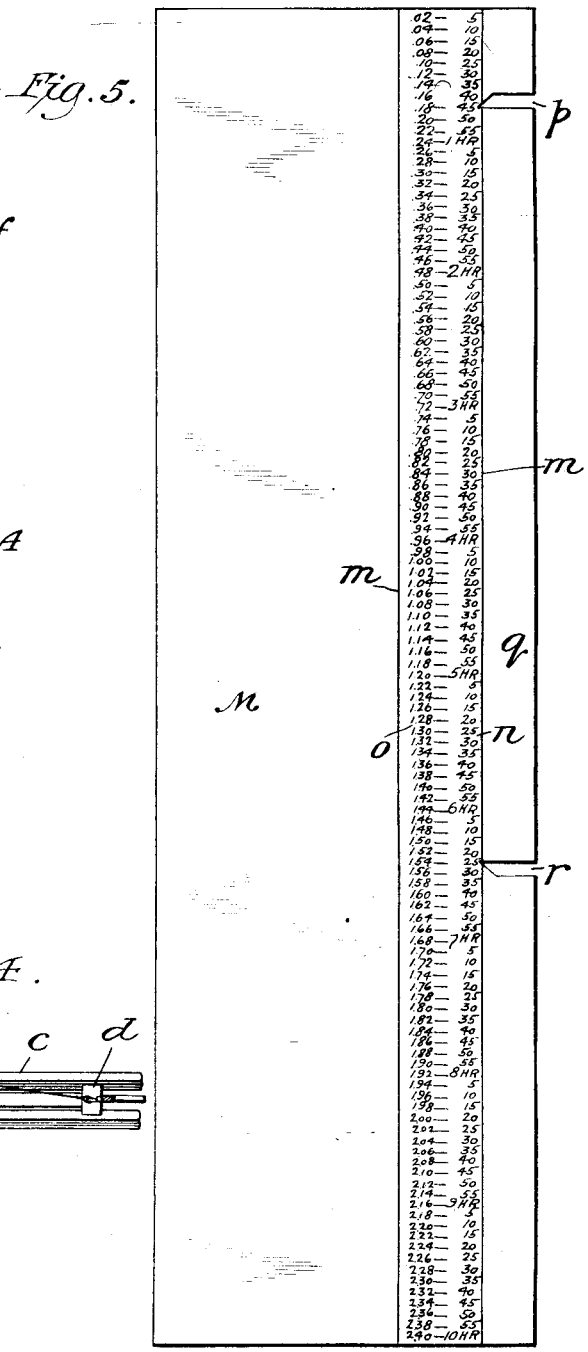

UNITED STATES PATENT OFFICE.

CLARENCE A. BISHOP, OF NEW YORK, N. Y.

APPARATUS FOR EFFECTING CALCULATIONS.

1,065,500.  Specification of Letters Patent.  Patented June 24, 1913.

Application filed August 27, 1909. Serial No. 514,866.

*To all whom it may concern:*

Be it known that I, CLARENCE A. BISHOP, a citizen of the United States, residing in the city of New York, borough of Brooklyn, county of Kings, and State of New York, have made certain new and useful Inventions in Apparatus for Effecting Calculations, of which the following is a specification.

This invention appertains to a calculating machine, and while it is particularly adapted for obtaining permanent and accurate records of factory costs and wages, it is adapted, also, for various uses in offices, factories, and other business establishments, since it enables elapsed time and wages to be calculated automatically, *i. e.*, without necessitating any calculations independently of the data given directly by the machine.

In many factories, and other places of business, each job passes through a number of operations, and these operations may be, and generally are, performed by different workmen, with or without the aid of machinery. It is manifest that it is particularly desirable to ascertain the labor cost on each job or operation. In most factories this is quite laborious and expensive, for the reasons, mainly, that the workmen are paid different rates of wages per hour, and the time consumed in the different operations by the various workmen varies within wide limits.

Various mechanical appliances and business systems have been devised and are in use for securing records from which the labor cost may be tabulated and computed, but there are many objections to the appliances now in use, among which are particularly the cost of the machines used, and the expense attending the calculation of the time and wages from the data on the cards.

The present invention secures, at a low initial cost in the appliances involved, an accurate and reliable record of the labor cost on each job, or part thereof, such records being made by the workmen and without loss of time. These records disclose, upon mere inspection, the time an employee has worked, and his wages at a predetermined rate, thereby practically eliminating the expense and labor now incident to determining the elapsed time and wages.

In the operation of my machine, use is made of a record card on the face of which are provided two parallel columns of figures, one for indicating elapsed time in hours and fractions thereof, and the other the wages to be paid to the employee, at a given rate, for such elapsed time. On the reverse side of the card, termed the back, and directly under the column indicating the time, is a column of figures denoting the hours of the day and fractions thereof, the figures on this scale running in an opposite direction to the figures of the time scale on the face of the card.

Each employee is supplied with record cards, the wage column on the face of which indicates the particular rate of wages he is to receive. These cards may be given to him by the foreman or time-keeper at the commencement of a job, or operation, and by means of the novel time controlled mechanism forming part of this invention, the card is at proper times suitably punched, preferably with two holes, notches or recesses, or by cutting away part of the card. The first punch or mark indicates the time when the work was begun and establishes a guide for properly positioning the card for the second punching or marking, whereby the elapsed time and the employee's compensation therefor may be determined by a direct reading from the card. The elapsed time is always read from the zero end of the time scale, thereby giving a direct reading, and precluding the necessity of subtraction or other calculation, incident in prior machines, to obtain this result.

In the accompanying drawings I have illustrated different practical embodiments of the machine or apparatus, and which may be employed in practising my novel method, but the constructions shown are to be understood as illustrative, only, and not as defining the limits of the invention.

Figure 1 is a plan view of the apparatus employed in my invention. Fig. 2 is a longitudinal section thereof on the line 2—2 of Fig. 1. Fig. 3 is a cross section, partly in elevation, the plane of the section being indicated by the dotted line 3—3 of Fig. 2. Fig. 4 is a detail plan showing the sliding rack and the spring drum therefor. Fig. 5 is a plan view of the face of the record card on which are produced indelible time marks at the beginning and the completion of the work by an employee working at a predetermined rate of wages per hour. Fig. 6 is a plan view of the back of the card shown in Fig. 5 and containing a time scale, and Fig. 7 shows a particular form of premium card which may be used in the apparatus for calculating certain specific data.

Referring particularly to Figs. 1 to 4, A is a suitable casing in which is the time train, B, provided with dial, $b$, which is exposed to view on one side of said casing, A. The arbors for the hour and minute hands, $b'$, $b^2$, of the time train extend through dial, $b$, but the particular arrangement of the time mechanism, and the construction thereof, is optional. Within the casing, preferably on the underside of the top thereof, is a fixed guide way, C, which extends lengthwise of said casing. As shown, said guide way comprises parallel rods, $c$, and end members, $c'$, the latter being fixed to the casing, and the rods being secured to said end members. D is a rack supported by the guide way for longitudinal movement thereon, coöperating with and moved by the time train. This rack is shown as secured to cross-heads, $d$, $d'$, which are fitted to rods, $c$, of the guide way for slidable movement thereon, whereby the rack is supported and moved forward in a rectilinear path by the time train. The rack is subsequently retracted by the action of a suitable device, such as spring, E, the same being coiled within a rotatable drum, $e$, mounted on a shaft, $e'$, the latter being supported in a bracket plate, $f$, attached to casing, A. A cord, cable or other flexible connection, F, is coiled on said spring-controlled drum, and said cord or cable is attached to an end portion of rack, D, or to one of its cross heads, as $d$. The rack is provided with gear teeth, $g$, certain of which teeth are separated by a gap or interval at $g'$, thereby providing for the noon hour, and with certain teeth of said rack meshes the teeth, $h$, of a rack driving gear, H, the latter being attached to one of the shafts of time train, B, for rotation with said shaft at the required speed. Said gear, H, is a mutilated gear, it being provided with gaps or spaces, $h'$, $h^2$, between certain teeth thereof, and while the gear is driven normally by the time train for the purpose of imparting traveling movement to rack, D, yet at certain times the rack is at rest, as during the noon hour, for the reason that the blank spaces, $h'$, are so positioned with reference to the gap, $g'$, that the teeth, $h$, of the time-driven gear are out of mesh with the teeth of the rack. In the top of casing, A, is a longitudinal slot, $i$, extending through which is a bent arm, $i'$, movable with rack, D, said arm being fastened, preferably, to one of the cross heads, as $d'$. Arm, $i'$, carries a card guide or indicator, I, above, or outside the top of, casing, A, which guide moves with rack, D, and at the same speed. Arm, $i'$, also carries a second indicator or guide, I', positioned with reference to guide, I, at a distance therefrom substantially the same as the length of the card employed in the machine. This necessitates the insertion of the card between the guides, and in correct position, lengthwise of the card, for the first punching operation, thereby precluding an employee from improperly punching said card.

J designates a device adapted to indelibly mark the record card. While various forms of indelible marking devices may be used, it is preferred to employ a punch, $j$, the same being provided on the lower end of a headed plunger, $j'$. Said plunger is slidably mounted in a member, $j^2$, attached to the top of casing, A, and it is held normally in a raised position by a spring, $k$. The punch is movable relative to a slotted bed plate, $k'$, and is adapted to operate upon a record card when the latter is first placed upon the bed plate, $k'$, one end of said card engaging the traveling guide or indicator, I, and the other end being practically in engagement with the second guide, I'.

The punch is preferably beveled on one side so as to cut a recess of the form shown in Figs. 5 to 7. This shape of recess enables the scales to be read more expeditiously and accurately, and, moreover, is an indication that the record card has been reversed between the first and second punching operations; otherwise, the beveled edges of the two recesses would be parallel to each other instead of at an angle. The position, laterally, of the record card, relative to punching device, J, is determined by a card guide, herein shown as comprising rails, L, L', and cross members, $l$, the latter being fastened to the casing. The rail, L, i. e., the rear rail, occupies a fixed position at one side of slot, $i$, parallel thereto, and relative to traveling indicator, I, and punching device, J, so that the rail is in the path of a record card when the latter is inserted in the machine, thereby serving as a guide or gage for determining the extent the card is inserted. The other rail, L', is supported slightly above the casing, A, by cross members, $l$, so that the record card can be inserted below the rail, L', and with its edge engaging rail, L. The elevated rail, L', is a sufficient distance from the rear rail to permit of free movement of guide or indicator, I, and said rail precludes an improper insertion of the card by an employee, since it necessitates the correct positioning of the card within the machine.

According to my invention, each employee is supplied with a record card for each job upon which he is to work. Essential features of this record card are two scales, preferably parallel, on the face of the card, one designating the time in hours and fractions thereof, termed a time scale, and the other designating wages at a predetermined rate. The time scale is calibrated to accord with the movement of the guide or indicator, I, to which movement is imparted, as stated, by a time train. One form of this record card is shown at M in Fig. 5, the back of the card being shown in Fig. 6. The card is provided on its face with two parallel lines, $m$, $m$, a column of figures, $n$, and a second column of figures, $o$, said columns of figures being positioned parallel to each other and between the parallel lines. The figures in the column $n$, represent the time in hours and fractions thereof, each hour being divided into twelve parts representing periods of 5 minutes, although this special division of time is optional. The figures of column, $o$, are set opposite those in the column, $n$, and said figures of column, $o$, represent the wages at a predetermined rate. This rate being divided to show the amount in dollars and cents for every five minutes indicated in the time column, $n$.

In the exemplified record card shown in Figs. 5 and 6, the time column, $n$, contains the figures representing a working day of ten (10) hours, whereas the figures in the wage column, $o$, show that the workman is entitled to compensation at the rate of $2.40 per day, or 24 cents per hour. The figures in the time and wage columns read progressively from the top to the bottom of the record card, and said figures of the wage column, $o$, are positioned opposite to, or in line with, the figures of the time column so as to show the value of the wages for any period of time within the ten working hours. While the figures in the time column, $n$, will remain constant for the cards which are supplied to all workmen whose wages per diem may vary, it is to be understood that cards are to be provided wherein the figures in the wages columns will represent the exact wages which the different workmen are entitled to receive, it being necessary on delivering a card, or series of cards, to a workman to exercise care in selecting a card whose wage column corresponds in rate to that paid the particular employee.

The back or reverse side of the record card, see Fig. 6, which has heretofore been briefly described, is provided with a time scale, $n'$, denoting the hours of the day and the fractions thereof, this scale being positioned directly under the time scale on the face of the card, but having its figures, $n^2$, running in an opposite direction from the corresponding figures on the face of the card, as will be seen by a comparison of the two scales, Figs. 5 and 6.

It will be obvious that the record cards may be provided with spaces for indicating the date of issue, the job number, the name or number of the individual workman, and any other data which it may be deemed necessary or expedient to note thereon.

The mode of operation is as follows: It is to be understood that the time train is in operation and that the guide or indicator, I, has been set in motion at the hour fixed for beginning of the work day, e. g. 7 a. m., this setting operation at such predetermined time, after once determined upon, being accomplished automatically by the time train. When a job, or operation thereon, is assigned to a workman, the first thing to be done by him is to indicate on his record card a guide to be utilized when the work is completed for determining the elapsed time spent on the job. He does this by inserting his card, face upward, under rail, L', and between guides, I and I', until the edge of the card engages rail, L, the end of the card containing the zero of the scales, $n$ and $o$, respectively, being in contact with guide, I; he then operates the punch, $j$, by depressing plunger, $j'$, thereby cutting a recess or notch, such as $r$, in space, $q$; this notch, taken in conjunction with time scale, $n'$, on the back of the card, indicates the time when the employee began work. It will be understood that if the position of this card is immediately reversed, in the machine, i. e., before perceptible time has elapsed, i. e., turned face downward, and with guide, I, entering said notch or recess, that the end of the card provided with the zeros of the scales, $n$ and $o$, on the face of said card will come directly under or be in the same vertical plane as the left edge of punch, $j$. It will be apparent, therefore, that if any time elapses after the card has been positioned as thus described, it will be indicated or registered on the time scale, $n$, on the face of the card, by operating the punch at the expiration of the elapsed time, it being merely necessary after the punching to withdraw the card from the machine for the purpose of reading on said time scale the position of the last punched hole, i. e., the one nearest the zero end of the scale.

The foregoing operation may be illustrated by an example, as follows: We will assume that when the card is first placed in the machine, face upward, and punched, the recess will occupy the position indicated by $r$, Figs. 5 and 6, and, accordingly, as will be observed from the position of this recess on the time scale, $n'$, on the back of the card, he began work at ten thirty five o'clock. Now, as previously stated, if this card is reversed end to end, with its face downward, and with guide, I, in said recess, and again punched after a certain time has elapsed, say at eleven twenty, said second punch or recess, $p$, will be so positioned with reference to scale, $n$, as to indicate thereon, reading from zero, and without any calculation, that forty five minutes have elapsed between the two punchings. It will be understood, of course, that in practically working the machine, the employee would not immediately reverse his card as heretofore described, but having first punched the same, he would then remove the card from the machine and proceed with his work. Having completed the work, he would then reinsert the card in the machine, reversed as described, i. e., face downward, with the guide, 1, in the said recess, and then operate the punch to produce the second recess therein. The elapsed time can then be read on scale, $n$, in the same manner as described in the specific example above given, and the compensation or wages to which the employee is entitled, for such elapsed time, is directly indicated and may be read on the wage scale, $o$. It will thus be observed that when the workman hands in his punched card, that his wages and elapsed time appear thereon without the necessity of any calculation whatsoever.

By beveling the punch as described, it will be apparent that the bevels of the recess punched on the face of the card will be opposite to that in the recess punched on the back of the card, thereby affording a means for determining whether or not the card has been reversed end to end in the machine after the first punching, and that it occupied such reversed position at the time of the second punching.

Referring to Fig. 7, this illustrates a form of card which may be used in the machine for the purpose of calculating the premium due an employee for accomplishing a given amount of work in less than a specified period; i. e. for expediting the work, known technically as a "premium plan" or "differential piece work." This card is the same as that heretofore described with the exception that the face thereof is provided with an additional time scale, $n^4$, and, also, with an additional rate scale, $o^2$. The figures on these scales, however, run in the reverse direction from those on the other time and rate scales, and may be positioned at any desired place on the card, though preferably in parallel relation to and adjoining said other scales.

An illustration of the manner of using this card for the purpose specified will be given. Let it be assumed that a workman has been assigned a job on which the employer has set a time limit of four hours and fifteen minutes; i. e., that the workman will be paid his usual rate, say twenty four cents per hour, if the work is accomplished in the time specified, and will be paid at the same rate, also, if he takes additional time to complete the work. However, if he accomplishes the work in less than 4 hours and 15 minutes, say in 3 hours and 50 minutes, he will be entitled to a premium for expediting the work to the extent, under the assumed conditions, of 25 minutes; this premium being at the same rate as his usual wages and amounting, therefore, at the rate of 24 cents per hour, to 10 cents. So far as punching the first recess, $p'$, and manipulating the premium card in the machine, are concerned, this is effected in exactly the same way as with the card shown in Figs. 5 and 6; in other words, the function or operation of the machine is the same on a premium card, as it is on the plain wage card heretofore described. The position of the second recess, however, indicates, in addition to the elapsed time and wages previously described, the time saved by the employee, and the wage premium to which he is entitled therefor. As shown in Fig. 7, the recess, $r'$, indicates the elapsed time of 3 hours and 50 minutes on the time scale, $n^3$, and the regular wage therefor of 92 cents on rate scale, $o'$. It also indicates on the auxiliary time scale, $n^4$, a saving of 25 minutes, i. e., an expediting of the work to the extent of 25 minutes, and on the auxiliary rate scale, $o^2$, the premium therefor of 10 cents, making a total of 102 cents for the elapsed time of 3 hours and 50 minutes.

It will be obvious that the mechanism and devices described may be employed for determining various data, such as the cost of operating a telephone for a given period, or the cost of running a machine for a given period, this latter data being of especial value in estimating the depreciation in wear and tear of such machine. It may be used, also, for measuring units of power, time, energy, etc. For whatever purpose used, however, the reading of the time scale, due to the punching and reversing of the record card in the manner heretofore described, is always from the zero mark on said scale, and the same is true in reading the wage scale. Such being the case, all the units calculable on the machine, such as time, wages, etc., are readable directly from the record cards.

It will be manifest that the principle of my invention may be embodied in a machine where the record card employed, instead of being of the rectangular shape described, as well as manipulated as described, may be of circular form, and caused to travel with the movable indicator in a circular path; i. e., the card will travel in a circle, instead of longitudinally, in which case the time and rate scales on the record card would be concentric.

Other changes in the construction and operation of the machine, without departing from the principle embodied therein, will be obvious.

Having thus fully described the invention, what I claim as new, and desire to secure by Letters Patent is:

1. In a calculating apparatus, a card punching device for producing an aperture in a card, a card guide device adapted to position a card in the path of said punching device, a member of said guide cooperating with the perforation produced in the card whereby said perforation and member determine the position of the card for a subsequent punching operation, and a time train for imparting movement to one of said devices relative to the other.

2. In a calculating apparatus, a card punching device for producing a recess in the edge of a card, a time train, and a movable card guide operated by said time train, said card guide being operable to advance a card across the path of said punching device, said card guide having a member cooperating with the recess produced in the card whereby said recess and member determine the position of the card for a subsequent punching operation.

3. In a calculating machine, a card recessing device, a time train, a movable guide operated by said time train and adapted to advance a card across the path of the recessing device, and a second guide movable by said time train and positioned at a distance from the first guide substantially equal to the length of the record card operated upon.

4. In a calculating machine, a recessing device, a guide against which the end of a card is adapted to be placed, a time train for imparting movement to said guide and for feeding the card across the path of the recessing device, and a fixed member for determining the position of the card transversely of said card.

5. In a calculating apparatus, a card punching device, a card guide device including a plurality of members, one of said members conforming to the punch produced in the card by the operation of said card punching device, and a time train whereby relative movement is secured between the card punching device and the card guide device.

6. In a calculating apparatus, the combination of a bed plate upon which a card is adapted to be positioned, a marking device in cooperative relation to said bed plate, a fixed bar positioned on the bed plate in operative relation to said marking device, another fixed bar positioned on the bed plate and above the horizontal plane of the first named bar, a card-guide device movable with relation to the marking device and to said fixed bars, and a time train connected for imparting movement to the card guide device, said bars and the card guide device cooperating with each other in determining the position of a card when inserted upon the bed plate.

7. In a calculating apparatus, a movable guide adapted to enter a recess in a record card, a time train for moving said guide, and a punch adapted for making a recess in a card and in which recess said guide may enter.

8. In a record making apparatus, a card punching device, a card guide device, and time mechanism for imparting movement to one of said devices relative to the other, said card guide device having means corresponding to the punch produced in a card at the initial operation for determining the position of said card for a subsequent punching operation.

9. In a calculating apparatus, the combination of a recessing device and a card guide, said recessing device and card guide being of corresponding cross sectional shape whereby the recess produced in a card by the recessing device will fit the card guide.

10. In a calculating apparatus, the combination of a punching mechanism for producing a recess in a card, a card guide, and time controlled mechanism for determining the position of the recess produced in the card, the card guide corresponding substantially to the form of the recess produced in the card by the operation of said punching mechanism.

11. In a calculating apparatus, the combination of a card guide, a recessing device operable at different periods of time upon the same card for producing therein a plurality of recesses, and time controlled mechanism for determining the position of said recess produced in the card, one of which recesses in the card is adapted to register with a card guide for obtaining a direct reading of the interval between said recesses.

12. In a calculating apparatus, the combination of a card marking device, a plurality of card guides, and time controlled mechanism, said card marking device being operable at different periods of time to produce on the same card a plurality of marks or punches, one of which marks or punches cooperates with one card guide to give a direct reading.

In testimony whereof I have signed my name to this specification in the presence of two subscribing witnesses.

CLARENCE A. BISHOP.

Witnesses:
    JAS. H. GRIFFIN,
    MARGARET C. POWELL.